United States Patent
Roath

(10) Patent No.: US 12,372,649 B2
(45) Date of Patent: Jul. 29, 2025

(54) ARTICULATING DEVICE FOR MOUNTING TRANSDUCERS

(71) Applicant: Ronald Wayne Roath, Dixon, IL (US)

(72) Inventor: Ronald Wayne Roath, Dixon, IL (US)

( * ) Notice: Subject to any disclaimer, the term of this patent is extended or adjusted under 35 U.S.C. 154(b) by 123 days.

(21) Appl. No.: 18/380,087

(22) Filed: Oct. 13, 2023

(65) Prior Publication Data

US 2024/0125928 A1    Apr. 18, 2024

Related U.S. Application Data

(60) Provisional application No. 63/415,659, filed on Oct. 13, 2022.

(51) Int. Cl.
| | |
|---|---|
| *G01S 15/04* | (2006.01) |
| *F16M 11/06* | (2006.01) |
| *F16M 11/18* | (2006.01) |
| *G01S 7/521* | (2006.01) |
| *G01S 15/93* | (2020.01) |

(52) U.S. Cl.
CPC ............ *G01S 15/93* (2013.01); *F16M 11/06* (2013.01); *F16M 11/18* (2013.01); *G01S 7/521* (2013.01)

(58) Field of Classification Search
CPC .......... G01S 15/93; G01S 7/521; G01S 15/96; F16M 11/06; F16M 11/18; F16M 11/10; F16M 11/2014; F16M 11/2021; F16M 13/02
USPC .......................................................... 367/93
See application file for complete search history.

(56) References Cited

U.S. PATENT DOCUMENTS

| | | | |
|---|---|---|---|
| 4,979,153 A | 12/1990 | Terry | |
| 5,182,732 A | 1/1993 | Pichowkin | |
| 7,729,203 B2 | 6/2010 | Betts et al. | |
| 9,153,224 B2* | 10/2015 | Bradley | G10K 11/006 |
| 9,626,951 B2 | 4/2017 | Caldwell et al. | |
| 11,059,556 B2* | 7/2021 | Ahlgren | B63H 20/32 |
| 2021/0056944 A1 | 2/2021 | Vance | |
| 2021/0278514 A1* | 9/2021 | Hughes | G01S 7/521 |
| 2021/0362818 A1 | 11/2021 | Ridl | |
| 2022/0373663 A1* | 11/2022 | Caspall | B63B 45/08 |

FOREIGN PATENT DOCUMENTS

JP    4183217 B2    11/2008

OTHER PUBLICATIONS fishfindermounts.com, Mount Photos, https://www.fishfindermounts.com/mount-photos (accessed Oct. 13, 2023).

* cited by examiner

*Primary Examiner* — Tai T Nguyen
(74) *Attorney, Agent, or Firm* — Brent Whitlock Law, LLC; Brent K. Whitlock

(57) ABSTRACT

A transducer mounting device for positioning and orienting a transducer is disclosed that can pivot the transducer about multiple axes and readily provide information regarding a direction which the transducer is pointing when the transducer detects a submerged mass. The disclosed device includes a rotatable pole to which a microcontroller, transmission module, and articulating sensor module are attached. Each of the transmission module and articulating sensor module include motors for positioning and orienting the transducer.

18 Claims, 14 Drawing Sheets

DETAIL A

DETAIL B

DETAIL B

DETAIL C

DOWN VIEW

FORWARD VIEW

PERSPECTIVE VIEW

DETAIL C

DETAIL C

ADAPTERS

CONTROLLERS

ARTICULATING DEVICE FOR MOUNTING TRANSDUCERS

CROSS-REFERENCE TO RELATED APPLICATION

The present application claims the benefit of priority under 35 U.S.C. § 119 from U.S. Provisional Patent Application Ser. No. 63/415,659, entitled "Motorized and Articulating Device for Mounting Live Transducers/Sonar," filed on Oct. 13, 2022, all of which is incorporated herein by reference in its entirety for all purposes.

TECHNICAL FIELD

The present disclosure generally relates to devices for mounting sensors, and more specifically relates to articulating devices for mounting transducers.

BACKGROUND

Unless otherwise indicated herein, the materials described in this section are not prior art to the claims in this application and are not admitted to be prior art by inclusion in this section. The background section may include information that describes one or more aspects of the subject technology.

Sensors may be useful for detecting masses submerged in fluid bodies, for example, bodies of water such as lakes, rivers, streams, etc. Sensors may utilize sonar for performing this function. Sonar (short for "sound navigation and ranging" or "sonic navigation and ranging") is a technique that utilizes transducer elements for performing sensing in fluid bodies. Transducer elements (commonly referred to as simply "transducers") may convert energy from one form to another, e.g., sound waves to electronic signals and vice-versa.

SUMMARY

Various embodiments of the present disclosure relate to an apparatus for underwater sensor positioning, for example, an articulating device for mounting transducers. The present disclosure covers a variety of configurations that may be employed to mount and articulate submerged sensors across multiple degrees of freedom. In some examples, transducers may be mounted and articulated while submerged in a body of water for finding and/or locating fish or other submerged masses. Some example embodiments include devices that indicate a present state of articulation of the submerged sensor. Example embodiments may also employ communications with a satellite-based radionavigation system (e.g., the global positioning system (GPS)) to better track the position of fish or submerged masses.

An exemplary apparatus for under water sensor positioning includes a pole having a first end and a second end, a microcontroller, and a transmission module which includes a transmission module motor. The transmission module is structurally attached to the pole between the first end and the second end. The exemplary apparatus also includes an articulating sensor module having a first sensor module motor, a second sensor module motor, and a sensor connector. The articulating sensor module is structurally attached to the pole proximate the second end. The microcontroller is in communication with the transmission module motor, the first sensor module motor, and the second sensor module motor. The sensor connector is mounted to the outside of the articulating sensor module and configured to facilitate attachment of a sensor. The transmission module motor is operably connected to the pole facilitating rotation of the pole substantially 360 degrees around a longitudinal axis of the pole based on the communication. The first sensor module motor is operably connected to the sensor connector, facilitating rotation of the sensor connector around a first axis perpendicular to a perimeter of the sensor connector based on the communication. The second sensor module motor is operably connected to the sensor connector, facilitating rotation of the sensor connector around a second axis perpendicular to the first axis and substantially perpendicular to the longitudinal axis of the pole based on the communication such that the first axis ranges from substantially perpendicular to the longitudinal axis of the pole to substantially parallel with the longitudinal axis of the pole.

In some embodiments, the first sensor module may include an adapter motor. In some embodiments, the second sensor module motor may include an arm motor. In some embodiments, the sensor connecter may include a sensor adapter mount. In some embodiments, the exemplary apparatus may include an electronics module structurally connected to the pole proximate the first end and comprising the microcontroller. In some embodiments, the exemplary apparatus may include a mounting arm that at least in part facilitates the rotation of the sensor connector around the second axis. In some embodiments, the communication may be based on input to the microcontroller from a user-operated controller. The input to the microcontroller may be obtained via a wireless communication. The microcontroller may be configured to, responsive to the input from the user-operated controller, selectively place the first sensor module motor and the second sensor module motor in one of each of a down view position, a forward view position, and a perspective view position via the communication. In some embodiments, the exemplary apparatus may include a GPS module in communication with the microcontroller. The microcontroller may control positioning of the transmission module motor, the first sensor module motor, and the second sensor module motor to obtain a GPS lock on a specific location, based on the GPS module input to the microcontroller. In some embodiments, the exemplary apparatus may include a GPS module in communication with the microcontroller and a compass module in communication with the microcontroller. The microcontroller may control positioning of the transmission module motor, the first sensor module motor, and the second sensor module motor to obtain a GPS lock on a specific location, based on both of the GPS module input to the microcontroller and compass module input to the microcontroller.

An exemplary apparatus for under water sensor positioning includes a pole having a first end and a second end, a microcontroller, and a transmission module having a transmission module motor. The transmission module is structurally attached to the pole between the first end and the second end. The exemplary apparatus also includes an articulating sensor module having a first sensor module motor, a second sensor module motor, and a sensor connector. The articulating sensor module is structurally attached to the pole proximate the second end. The exemplary apparatus also includes an electronics module that has a light array. The microcontroller is in communication with the light array, the transmission module motor, the first sensor module motor, and the second sensor module motor. The sensor connector is mounted outside of the articulating sensor module and is configured to facilitate the attachment of a sensor. The transmission module motor is operably connected to the pole facilitating the rotation of the pole. The first sensor module motor is operably connected to the sensor connector, facilitating rotation of the sensor connector around a first axis based on the communication. The second sensor module motor is operably connected to the sensor connector, facilitating rotation of the sensor connector around a second axis based on the communication. The light array indicates placement of the first sensor module motor and the second sensor module motor in each of a down view position, a forward view position, and a perspective view position via the communication.

In some embodiments, the light array may include a directional indicator. In some embodiments, the directional indicator may include the light array. In some embodiments, the exemplary apparatus may include a mounting arm that at least in part facilitates rotation of the sensor connector around the second axis. In some embodiments, the communication may be based on input to the microcontroller from a user-operated controller. In some embodiments, the input to the microcontroller may be obtained via a wireless communication. In some embodiments, the exemplary apparatus may include a GPS module in communication with the microcontroller. In some embodiments, the exemplary apparatus may include an electronics module structurally connected to the pole proximate the first end, the electronics module having the microcontroller and the light array. In some embodiments, the light array includes an array of LEDs capable of emitting a plurality of colors. In some embodiments, the exemplary apparatus may include an indicator cap proximate the first end, wherein the indicator cap includes the array of LEDs. In some embodiments, the array of LEDs may be arranged in a ring around a diameter of the indicator cap.

An exemplary apparatus for under water sensing includes a pole comprising a first end and a second end, and an electronics module structurally connected to the pole proximate the first end. The electronics module includes an array of LEDs arranged in a ring around a diameter of the electronics module, and a microcontroller. The apparatus includes a transmission module having a transmission module motor. The transmission module is structurally attached to the pole between the first end and the second end. The apparatus also includes an articulating sensor module that has a first sensor module motor, a second sensor module motor, and a sensor connector. The articulating sensor module is structurally attached to the pole proximate the second end. The microcontroller is in communication with the array of LEDs, the transmission module motor, the first sensor module motor, and the second sensor module motor. The sensor connector is mounted to the outside of the articulating sensor module and is configured to facilitate attachment of a sensor. The transmission module motor is operably connected to the pole facilitating rotation of the pole substantially 360 degrees around a longitudinal axis of the pole based on the communication. The first sensor module motor is operably connected to the sensor connector. The operable connection facilitates rotation of the sensor connector around a first axis perpendicular to a perimeter of the sensor connector based on the communication. The second sensor module motor is operably connected to the sensor connector. The operable connection facilitates rotation of the sensor connector around a second axis perpendicular to the first axis and substantially perpendicular to the longitudinal axis of the pole based on the communication such that the first axis ranges from substantially perpendicular to the longitudinal axis of the pole to substantially parallel with the longitudinal axis of the pole. The array of LEDs indicates placement of the first sensor module motor and the second sensor module motor in each of a down view position, a forward view position, and a perspective view position via the communication.

In various other embodiments of the present disclosure, the electronics module may be structurally connected to the pole at the first end. The electronics module may further include the microcontroller.

In various embodiments of the present disclosure, a mounting arm is included. The mounting arm, at least in part, may facilitate the rotation of the sensor connector around the second axis.

In various embodiments of the present disclosure, the communication between the microcontroller and the transmission module motor, the first sensor module, and the second sensor module may be based on input to the microcontroller from a user-operated controller. In some embodiments, the user-operated controller may include a user foot controller or a user wireless controller.

In various embodiments of the present disclosure, the input to the microcontroller from the user-operated controller or user-operated controllers may be obtained via wireless communication.

In various other embodiments of the present disclosure, the microcontroller may be configured to selectively place the first sensor module motor and the second sensor module motor in one of each of a down view position, a forward view position, and a perspective view position. The microcontroller may selectively place the first sensor module motor and the second module motor in a position responsive to communication received the user-operated controller.

In various embodiments of the present disclosure, a GPS (or other radionavigation system) module may communicate with the microcontroller.

In various embodiments of the present disclosure, the microcontroller, based on GPS (or other radionavigation system) module input, may control positioning of the transmission module motor, the first sensor module motor, and the second sensor module motor in order obtain a GPS lock on a specific location.

In various embodiments of the present disclosure, a GPS (or other radionavigation system) module may communicate with the microcontroller, and a compass module may communicate with the microcontroller.

In various embodiments of the present disclosure, the microcontroller may, based on GPS (or other radionavigation system) module input to the microcontroller and compass module input to the microcontroller, control position of the transmission module motor, the first sensor module motor, and the second sensor module motor in order to obtain a GPS lock on a specific location.

In various embodiments of the present disclosure, the electronics module may be structurally connected to the pole at the first end. The electronics module may further include the microcontroller and the light array.

In various embodiments of the present disclosure, a light array may include an array of LEDs capable of emitting a plurality of colors.

In various embodiments of the present disclosure, an indicator cap may be included proximate to the first end of the pole. The indicator cap may include an array of LEDs.

In various embodiments of the present disclosure, the array of LEDs included in an indicator cap may be arranged in a ring around a diameter or perimeter of the indicator cap.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying diagrams.

Figure 1:
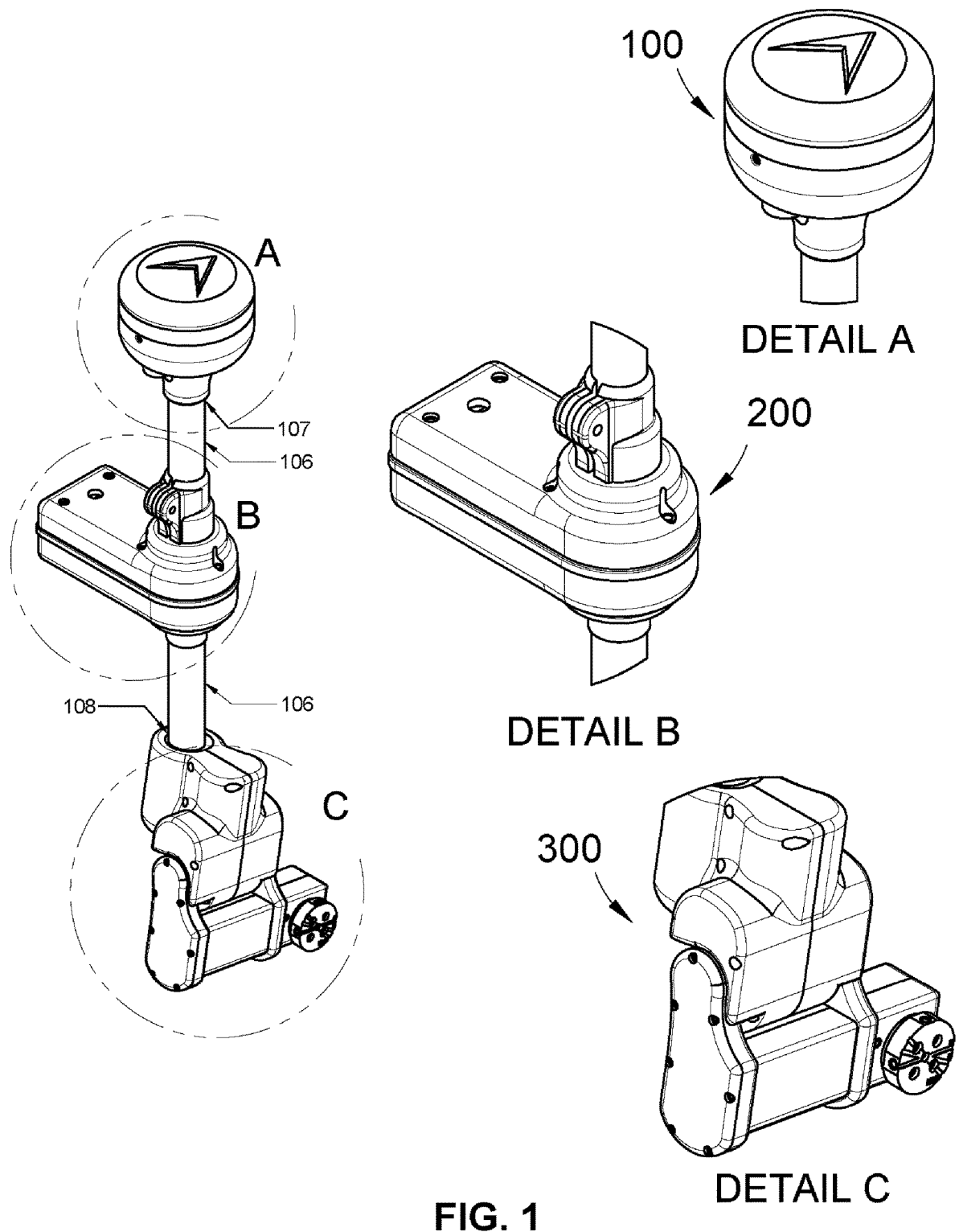
FIG. 1 depicts an isometric view of an electronics module, a transmission module, and an articulating sensor module attached to a common pole, and separately in greater detail, according to an example embodiment of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Sensors such as transducers may be used to determine the depth and topography of a fluid body and detect submerged masses within the fluid body, for example, fish, maritime wreckage, or other debris within a body of water. Once submerged in water, a transducer may convert an electrical impulse provided by an electronic controller into a sound wave to be transmitted within the water. When the sound wave encounters a submerged mass, it may reflect off of the mass, thereby creating echoes. Once these echoes make their way back to the transducer, the transducer may convert the received sound waves of the echoes into electrical signals. The transducer or electronic device coupled thereto may then interpret the electrical signals corresponding to the echoes in order to reveal characteristics of the mass that caused the echoes as well as its position relative to the transducer. In this way, transducers may be used to find a mass submerged in water.

To detect masses submerged in a fluid body, sensors such as transducers may be submerged within that fluid body. Traditionally, this has been accomplished in several ways. In some instances, the sensor has been mounted directly to the hull of a maritime craft or the exterior of some other structure somewhere below the waterline of the fluid body. In other instances, sensors have been directly attached to trolling motors. Trolling motors may be used in conjunction with sensors used to detect submerged masses because they produce less noise than other outboard marine propulsion systems. In yet other instances, sensors have been attached to a pole that is lowered into the fluid (e.g., water). However, in each of the existing solutions, the sensor may not be articulated about multiple axes once it is submerged in the water.

Many of the existing sensors, such as those intended for fish finding, have a limited field of view; they may only see what is in front of them. Consequently, the ability to see submerged masses using these existing sensors may be limited to the directions that the sensor can be orientated by the transducer to see. Thus, there is a need for a transducer mounting device that may pivot the transducer about multiple axes, and that therefore offers an attached sensor a greater range of motion once it has been submerged.

Accompanying the increased ability to articulate a sensor in many different directions while being submerged, for example, are various challenges to be addressed. For example, the value of being able to pivot a submerged sensor about multiple axes is limited if neither the device performing the articulating nor a user of the device is able to keep track of which direction the sensor is being pointed. Furthermore, even when the user is aware of the current orientation of the sensor, keeping track of submerged objects which are inherently mobile, such as fish, may be difficult. This task is all the more difficult when the articulating sensor mounting device is itself attached to a moving platform, such as a marine craft used for fishing.

To address these challenges, and more, described herein are articulating mounting devices for sensors which can articulate the attached sensor across multiple degrees of freedom when the sensor is submerged in a fluid body. Many of the presently available sensors which are used to detect masses submerged in a fluid body are attachable to a mounting device for operation. Examples of fluid bodies include rivers, streams, lakes, ponds, oceans, or any other fluid body. Once the sensor is attached to the mounting device, the mounting device may then be employed to lower the sensor into a fluid body. Many of the presently available sensors which are used for detecting masses submerged in fluid bodies often only have a limited field of vision. This limitation is often present with respect to transducers used for detecting masses submerged in fluid bodies. As such, a sensor's ability to detect submerged masses may be constrained to the directions in which the mounting device is capable of orientating the sensor to perceive. It is therefore desirable to have a mounting device that may be used to articulate a sensor across many degrees of freedom. The presently available mounting devices for sensors used to detect masses submerged in fluid bodies are only capable of articulating an attached sensor across limited degrees of freedom.

The present disclosure describes various examples pertaining to a mounting device capable of articulating a sensor across multiple degrees of freedom. Once submerged in the body of fluid (e.g., a body of water), the exemplary devices of the present disclosure facilitate a user to adjust a depth within the body of fluid to which the sensor is submerged and rotate the sensor about three axes, for example, three orthogonal axes.

Mounting devices capable of articulating a sensor may be driven either mechanically by a user or via motors connected to an electric power supply. Both methods of driving the articulation of the sensor may have respective advantages and disadvantages. Regardless of the mechanism by which the articulation of the sensor may be driven, the utility of a mounting device that can articulate a sensor through multiple degrees of freedom may be limited if the user is not aware of the current state of the sensor's articulation. If a user is not aware of the current state of a sensor's articulation when the sensor detects a mass submerged in a fluid body, it may be difficult for the user to determine in which direction that mass is positioned relative to the user's position. Addressing this challenge, the present disclosure describes various examples of a mounting device for a sensor that incorporate one or more directional indicators. The directional indicators may communicate to the user the present state of articulation of the sensor. The directional indicators may thereby facilitate the user to easily keep track of the present articulation of the sensor and thereby eliminate the need for the user to remove the sensor from the fluid body in order to determine the present state of articulation of the sensor.

Mounting devices for sensors capable of detecting masses submerged in a fluid body are often mounted upon platforms adjacent to a body of water (e.g., fishing piers) or upon a platform floating upon a body of water such as a maritime craft that may be used for fishing or other purposes. In either case, the platform may be mobile. When the platform is mobile, the tracking of a submerged mass may be especially challenging for the user even when the user is fully aware of the sensor's present state of articulation.

This challenge is further compounded when the submerged mass the user wishes to track is inherently mobile such as is the case with, for example, fish. Addressing this challenge, the present disclosure describes various examples of a mounting device capable of communicating with a radionavigation system (e.g., a satellite-based radionavigation system) such as GPS. Communicating with a radionavigation system may facilitate the mounting device to record the position of a submerged mass detected by the sensor in terms of its coordinates or otherwise. Once this coordinate information is relayed to the user, it may be much easier for the user to determine the location of the detected submerged mass even when the platform upon which the mounting device is affixed is in motion and when the sensor is no longer in the same position from which it had detected the submerged mass. Moreover, when a sensor makes repeated detections of a submerged mass, any change in position between detections may be tracked. By comparing the change in position of the submerged mass at each detection, a user may anticipate the trajectory of submerged masses which are mobile such as is often the case with, for example, fish.

The present disclosure relates to a mounting device for sensors that may be used to detect masses submerged in fluid bodies. The various embodiments and examples set forth in the present disclosure may articulate a sensor across multiple degrees of freedom. The ability to articulate the sensor across multiple degrees of freedom facilitates the sensor to view larger areas from more angles than prior mounting devices. The present disclosure further discloses exemplary indicating devices that provide indications of the attached sensor's current state of articulation. The exemplary indicating devices for indicating the attached sensor's current state of articulation facilitate the user to more easily determine the location of a mass detected by the sensor relative to the user. The present disclosure also describes integrated electronic systems that incorporate the capability for the device to communicate with a radionavigation system such as GPS. The incorporation of the ability to communicate with a radionavigation system facilitates the user to keep better track of submerged masses once they have been detected by the sensor than prior mounting devices.

With reference now to the accompanying figures, FIGS. 1-12 depict an exemplary embodiment of the present disclosure. It is to be understood that these drawings depict example implementations in accordance with the present disclosure and are, therefore, not to be considered limiting of its scope.

FIG. 1 depicts an isometric view of an electronics module 100, a transmission module 200, and an articulating sensor module 300 attached to a common pole 106, and separately in greater detail, according to an example embodiment of the present disclosure. Detail A of FIG. 1 depicts an isometric view of the electronics module 100 according to an example embodiment of the present disclosure. Detail B of FIG. 1 depicts an isometric view of the transmission module 200 according to an example embodiment of the present disclosure. Detail C of FIG. 1 depicts an isometric view of the articulating sensor module 300 according to an example embodiment of the present disclosure. The pole 106 has a first end or pole top 107 and a second end or pole bottom 108. The electronics module 100 is illustrated as being mounted on the pole top 107. The pole 106 is disposed through the transmission module 200. The articulating sensor module 300 is mounted on the pole bottom 108, or second end of the pole 106. In various examples, the pole 106 may be fashioned with one or more elongated members.

The pole 106 may be adjustable in length in various examples. The pole 106 may be solid or hollow. The pole 106, the electronics module 100, the transmission module 200, and the articulating sensor module 300 may be manufactured from various different materials, preferably materials that are resistant to corrosion as well as suitable for submersion in a fluid body. Such materials may include, but are not limited to, steel, stainless steel, aluminum, titanium, metal alloys, plastics, resins, ceramics, other suitable materials as known in the art, and/or combinations thereof.

Figure 2:
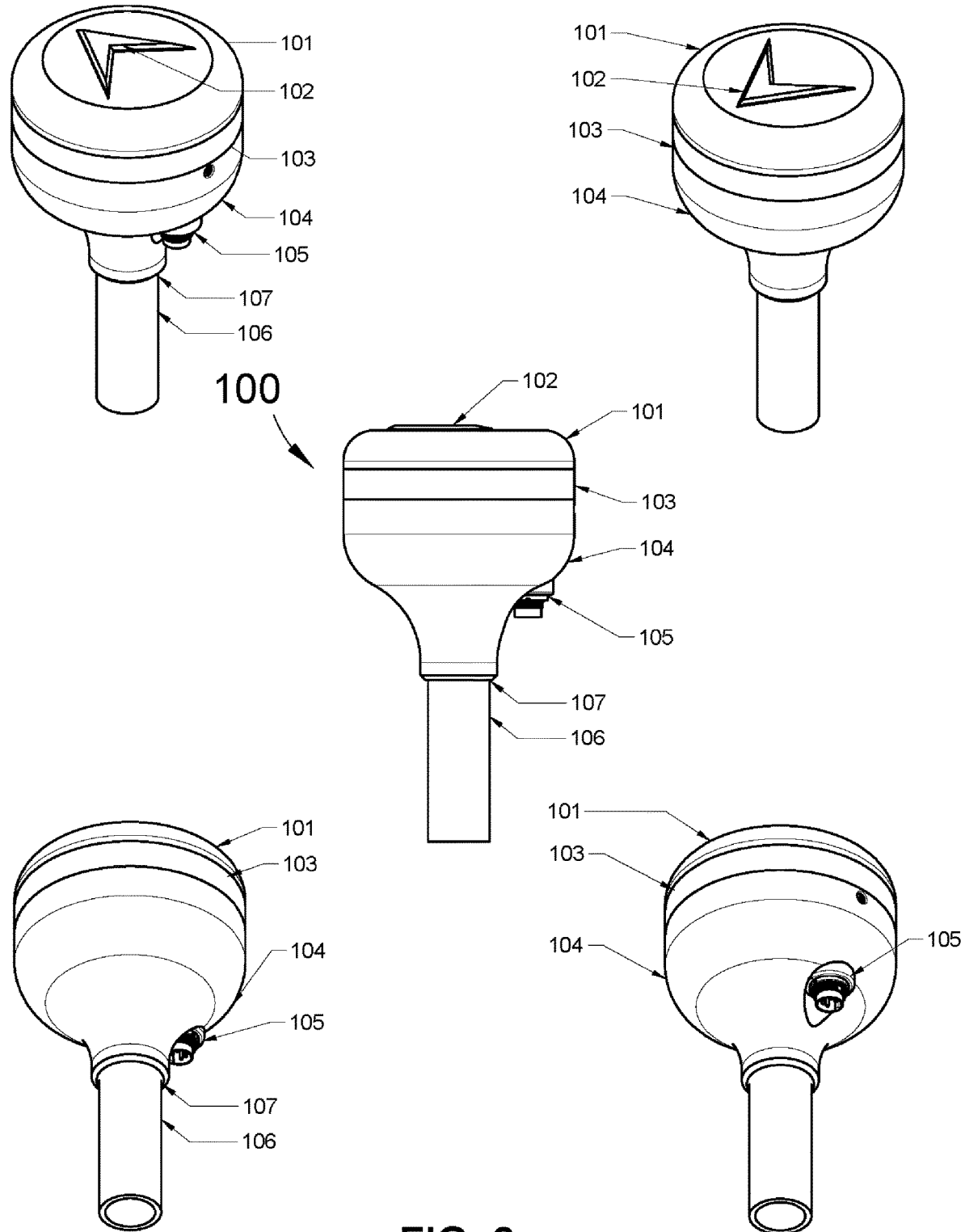
FIG. 2 depicts an orthographic view of the electronics module and four isometric views of the electronics module, according to an example embodiment of the present disclosure.

FIG. 2 depicts an orthographic view of the electronics module 100 and four isometric views of the electronics module 100 according to an example embodiment of the present disclosure. The electronics module 100 may be roughly cylindrical in shape, for example, as depicted in FIG. 2. Other examples (not shown) may incorporate alternative geometries and configurations. The electronics module 100 may include an electronics module top 101. The electronics module top 101 may include an indicator cap. The electronics module top 101 may have an aperture through its uppermost surface. The aperture of the electronics module top 101 may have a profile that complements the profile of a directional indicator 102. The directional indicator 102 may protrude through the aperture of the electronic module top 101. The directional indicator 102 may be used to indicate the compass direction matching the present articulation of a sensor (e.g., transducer) that has been attached to the exemplary articulating device. Alternative examples of the present disclosure may include, but are not limited to, embodiments wherein the electronics module top 101 lacks an aperture matching the profile of directional indicator 102 and/or is transparent and wherein the directional indicator 102 may be viewed beneath the transparent face of the electronics module top 101. Further alternative example configurations may employ electronic displays rather than the analog display utilized in the example embodiment depicted in FIG. 2. A visual indicator 103 may be disposed below the electronics module top 101. An electronics module bottom 104 may be disposed below the visual indicator 103. An electrical port 105 may be disposed on the underside of the electronics module bottom 104 for connection to various electrical components and/or power sources. In other examples, the electrical port 105 may be mounted in a variety of other locations.

Figure 3:
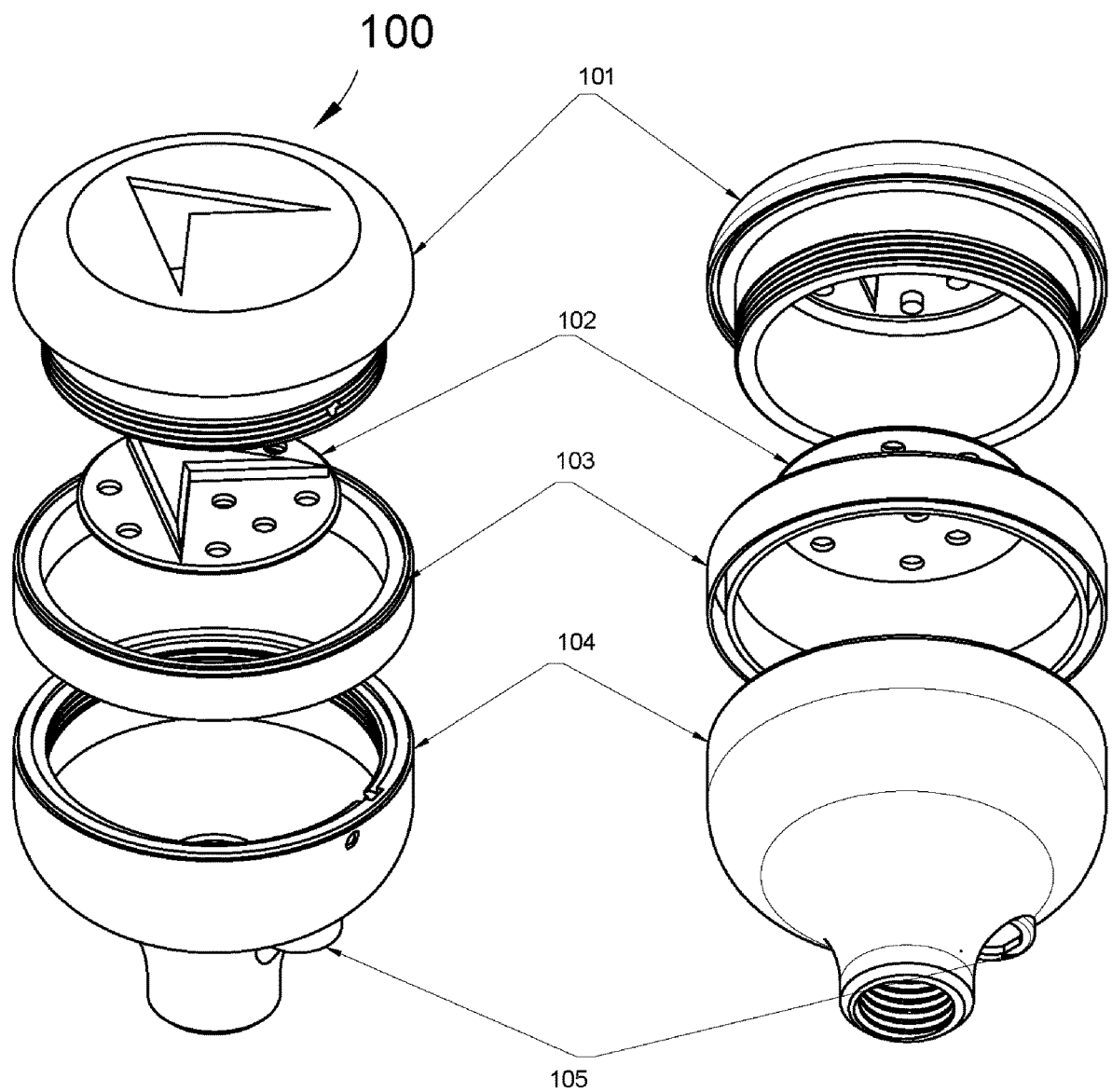
FIG. 3 depicts two exploded assembly isometric views of the electronics module, one seen from an upper perspective and another seen from a lower perspective, according to an example embodiment of the present disclosure.

FIG. 3 depicts two exploded assembly isometric views of the electronics module 100, one seen from an upper perspective and another seen from a lower perspective, according to an example embodiment of the present disclosure. The electronics module 100 may include the electronics module top 101, which may also be referred to as an indicator cap. The electronics module top 101 may be disposed through a visual indicator 103. The visual indicator 103 may incorporate an array of lights such as LED lights or other types of lights which may be arranged around the perimeter of the visual indicator 103. The lights arranged around the perimeter of the visual indicator 103 may display one or more colors. The array of lights around the perimeter of the visual indicator 103 may display one or more symbols, letters, numbers, words, flashes, and various other visual signals, individually and/or in synchrony or in symphony with one another, for communicating the sensor's current state of articulation to the user. The visual indicator 103 may be utilized to indicate the placement of an adapter motor 312 (see FIG. 10) and an arm motor 412 (see FIG. 11) in each of a down view position, a forward view position, and a perspective view position. The adapter motor 312 may be controlled from a microcontroller, which may be included with the electronics module 100 or in electrical communication with the electronics module 100 via the electrical port 105. The electronics module top 101 may engage with the visual indicator 103 via tongue and groove fittings. Other examples may mate the electronics module top 101 and the visual indicator 103 by other fitting devices, for example, threaded fittings, gaskets, screws, clasps, bolts, and various other fittings. In other examples, the electronics module top 101 and the visual indicator 103 may be manufactured from a single piece of material. The electronics module top 101 may include male threads. The male threads of the electronics module top 101 may complement female threads of the electronics module bottom 104. Alternative examples may employ various other fastening devices for fastening the electronics module top 101, directly or indirectly, to the electronics module bottom 104, for example, screws, bolts, clamps, rivets, clasps, seams, and various other fasteners. In the exemplary exploded assembly view of FIG. 3, the directional indicator 102 is depicted as being disposed below the electronics module top 101 and the visual indicator 103 is depicted as being disposed below the electronics module top 101. The electronics module bottom 104 is depicted as being disposed below the visual indicator 103 and the electrical port 105 is depicted as being mounted on the underside of the electronics module bottom 104.

Figure 4:
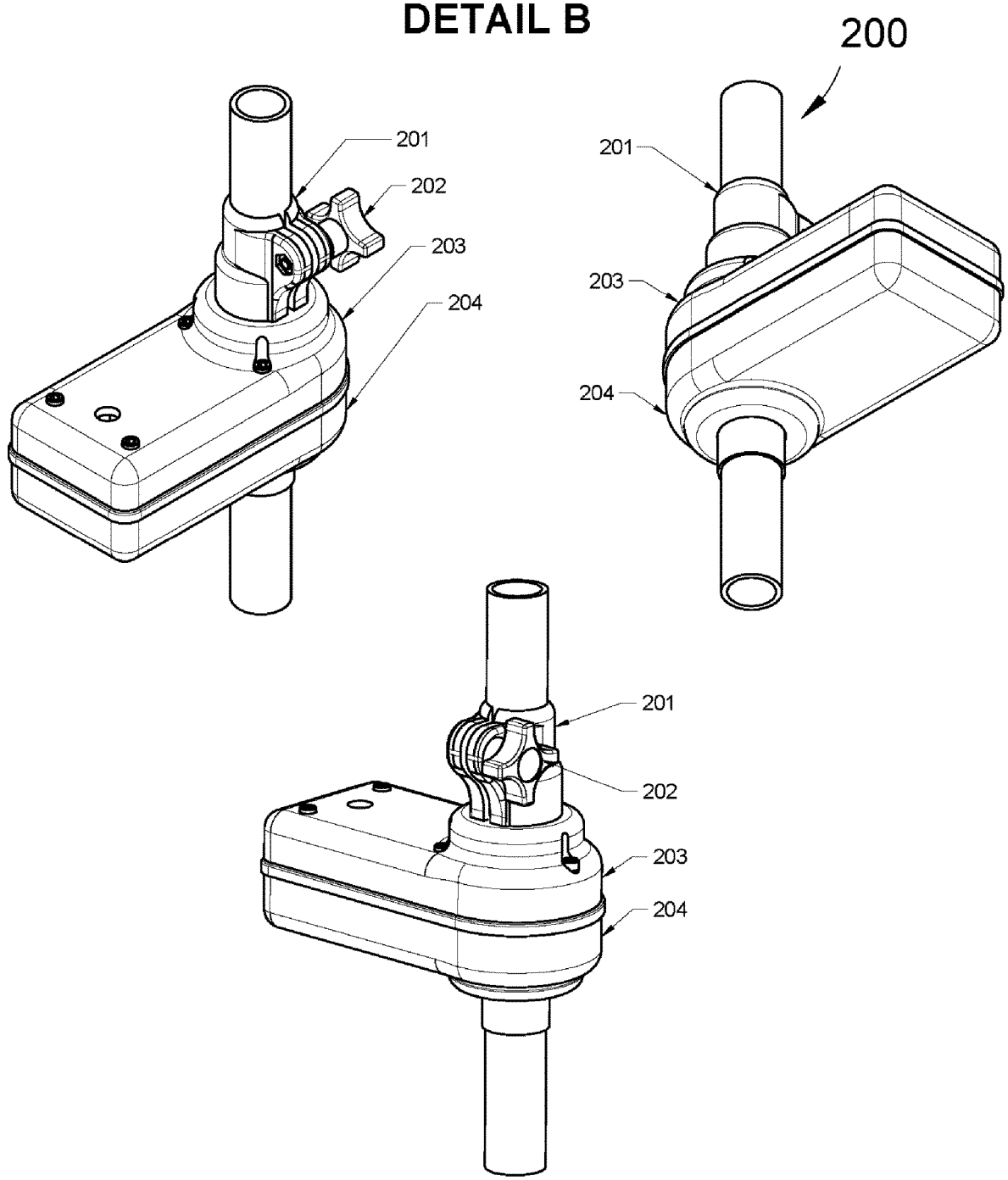
FIG. 4 depicts three isometric views of the transmission module, from different vantage points, according to an example embodiment of the present disclosure.

FIG. 4 depicts three isometric views of the transmission module 200, from different vantage points, according to an example embodiment of the present disclosure. The transmission module 200 may include a locking collar 201, a locking fastener 202, a transmission module top 203, and a transmission module bottom 204. The locking collar 201 may include female threads complementary to male threads on the locking fastener 202. The locking collar 201 and the locking fastener 202 may be used in conjunction by the user to fix the translational motion of the pole 106 through the aperture of the locking collar 201 at various points along the pole 106's length. In this way, a sensor affixed to the articulating sensor module 300 may be lowered into a fluid body at a depth that is ideal for the user's application. In various other examples, other fastening, locking, and/or friction-based devices for fixing the translational motion of the pole through the aperture of the locking collar 201 may be employed such as bolts, clamps, latches, locks, lugs, screws, and other mechanisms and fasteners.

Figure 5:
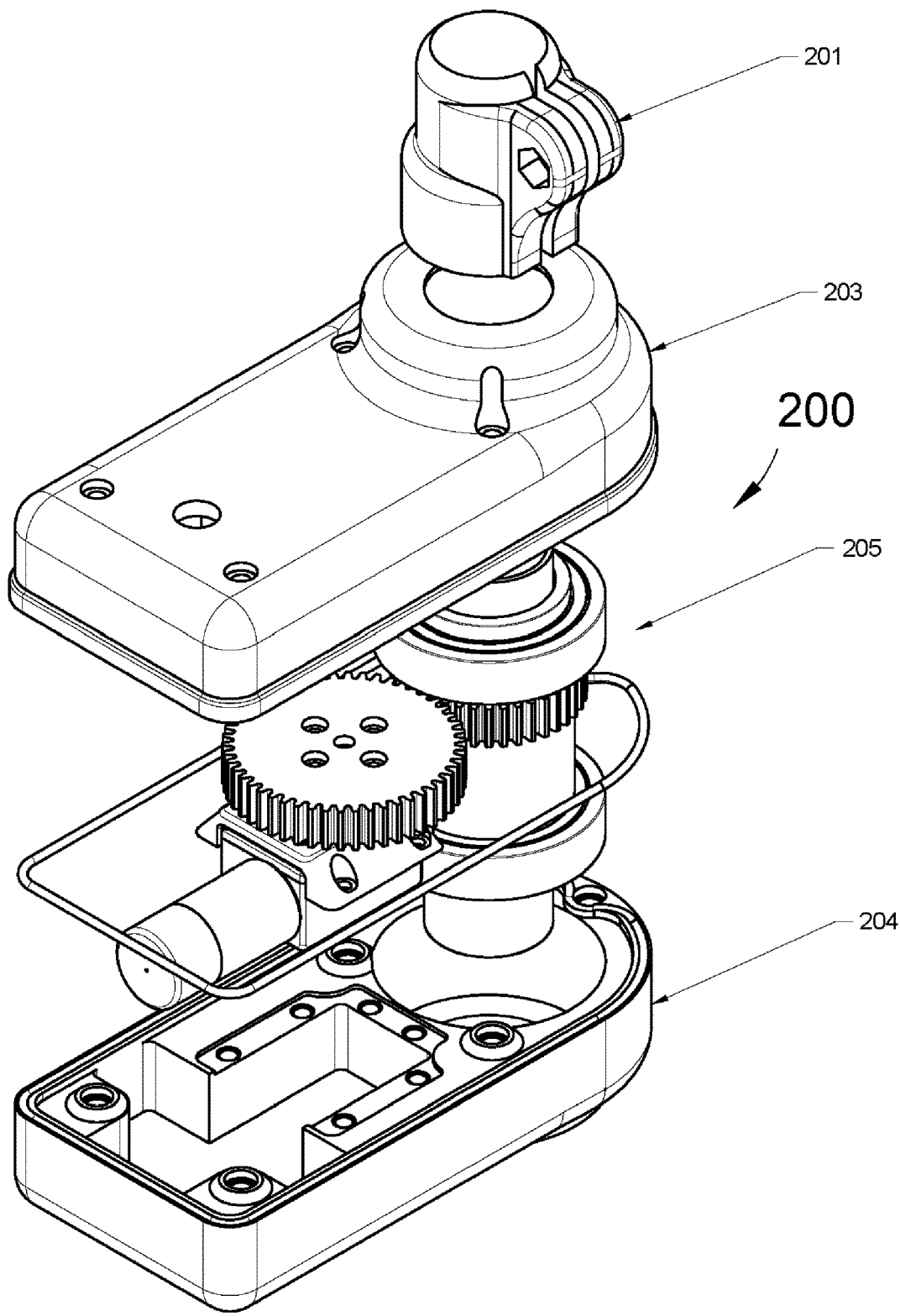
FIG. 5 depicts an exploded assembly isometric view of the transmission module, according to an example embodiment of the present disclosure.

FIG. 5 depicts an exploded assembly isometric view of the transmission module 200, according to an example embodiment of the present disclosure. The locking collar 201 is shown above the transmission module top 203. The transmission module top 203 is shown above the transmission module bottom 204. Other examples may incorporate alternative housing configurations. A transmission system 205 incorporated into the transmission module 200, including gears and associated transmission components, is depicted as being disposed in between the transmission module top 203 and the transmission module bottom 204. In other examples, various exemplary transmission systems other than the depicted exemplary transmission system 205 may be employed.

Figure 6:
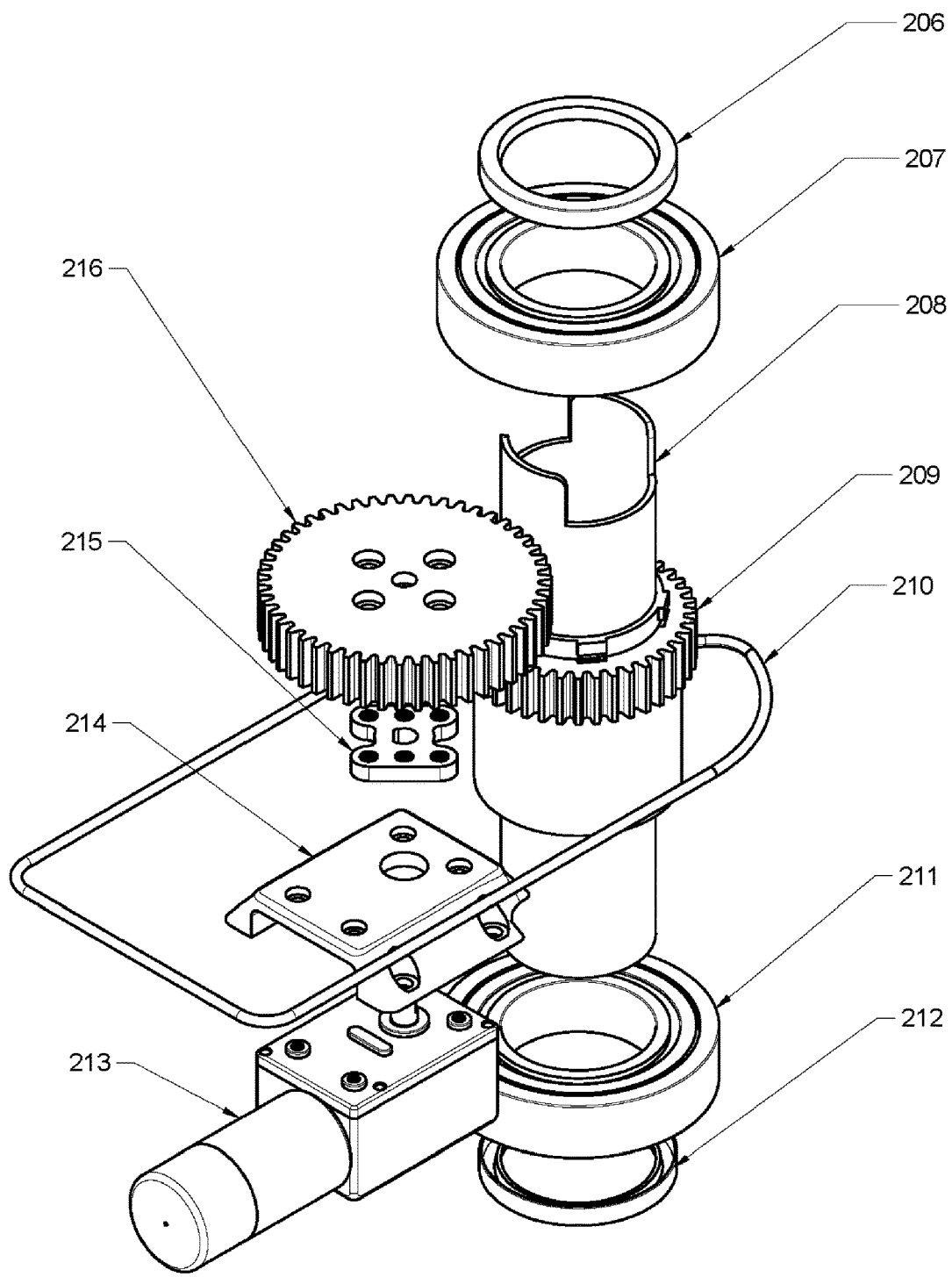
FIG. 6 depicts an exploded assembly isometric view of the transmission module (without the transmission module top and transmission module bottom), according to an example embodiment of the present disclosure.

FIG. 6 depicts an exploded assembly isometric view of the transmission module 200 (without the transmission module top 203 and transmission module bottom 204), according to an example embodiment of the present disclosure. The transmission module top 203 and the transmission module bottom 204 are hidden from view in this depiction so that inner transmission components of the transmission system 205 are more clearly depicted. A first transmission seal 206 may engage with a first transmission bearing 207.

In other examples, various other seals, gaskets, and O-rings may be employed in lieu of or in conjunction with the first transmission seal 206. In other examples, various other types of bearings, such as, for example, ball bearings and/or journal bearings, may be employed in lieu of or in conjunction with the first transmission bearing 207.

A pole carrier 208 may be disposed through a first transmission gear 209. The pole carrier 208 may be mated to the first transmission gear 209 by keys on the exterior surface of the pole carrier 208. A transmission gasket 210 may be engaged with the transmission module top 203 and the transmission module bottom 204. In other examples, various other seals, gaskets, and/or O-rings may be employed in lieu of or in conjunction with the transmission gasket 210. The pole carrier 208 may be disposed through the second transmission bearing 211. In other example embodiments, various other types of bearings, such as, for example, ball bearings and journal bearings, may be employed in lieu of or in conjunction with the second transmission bearing 211. The second transmission bearing 211 may be engaged with a second transmission seal 212. In other examples, various other seals, gaskets, and/or O-rings may be employed in lieu of or in conjunction with the second transmission seal 212.

The first transmission gear 209 may have cogs complementary to cogs of a second transmission gear 216. In the depicted example, the first transmission gear 209 and the second transmission gear 216 are spur gears. Various examples may employ these and/or other types of gears, e.g., helical gears, bevel gears, miter gears, and/or internal gears. Various examples may employ a transmission system of a type as illustrated and/or other types of transmission systems, e.g., screw threads, belt drives, chain drives, pulley drives, and/or various other transmission systems. A second transmission gear mount 215 may engage with a transmission module motor bracket mount 214. The transmission module motor bracket 214 may engage with a drive shaft of transmission module motor 213.

The transmission module motor 213 may be in communication with a microcontroller. The microcontroller may be in communication with a user-operated controller. Communication from the microcontroller prompted by operation of the user-operated controller may cause the drive shaft of the transmission motor 213 to rotate. The rotation of the drive shaft of the transmission motor 213 may cause the second transmission gear 216 to rotate with it. The rotation of the transmission gear 216 may cause the first transmission gear 209 to rotate in the opposite direction. The rotation of the first transmission gear 209 may cause the pole 106 to rotate with it. The articulating sensor module 300 may be fixed to the pole 106 and rotate with it.

Figure 7:
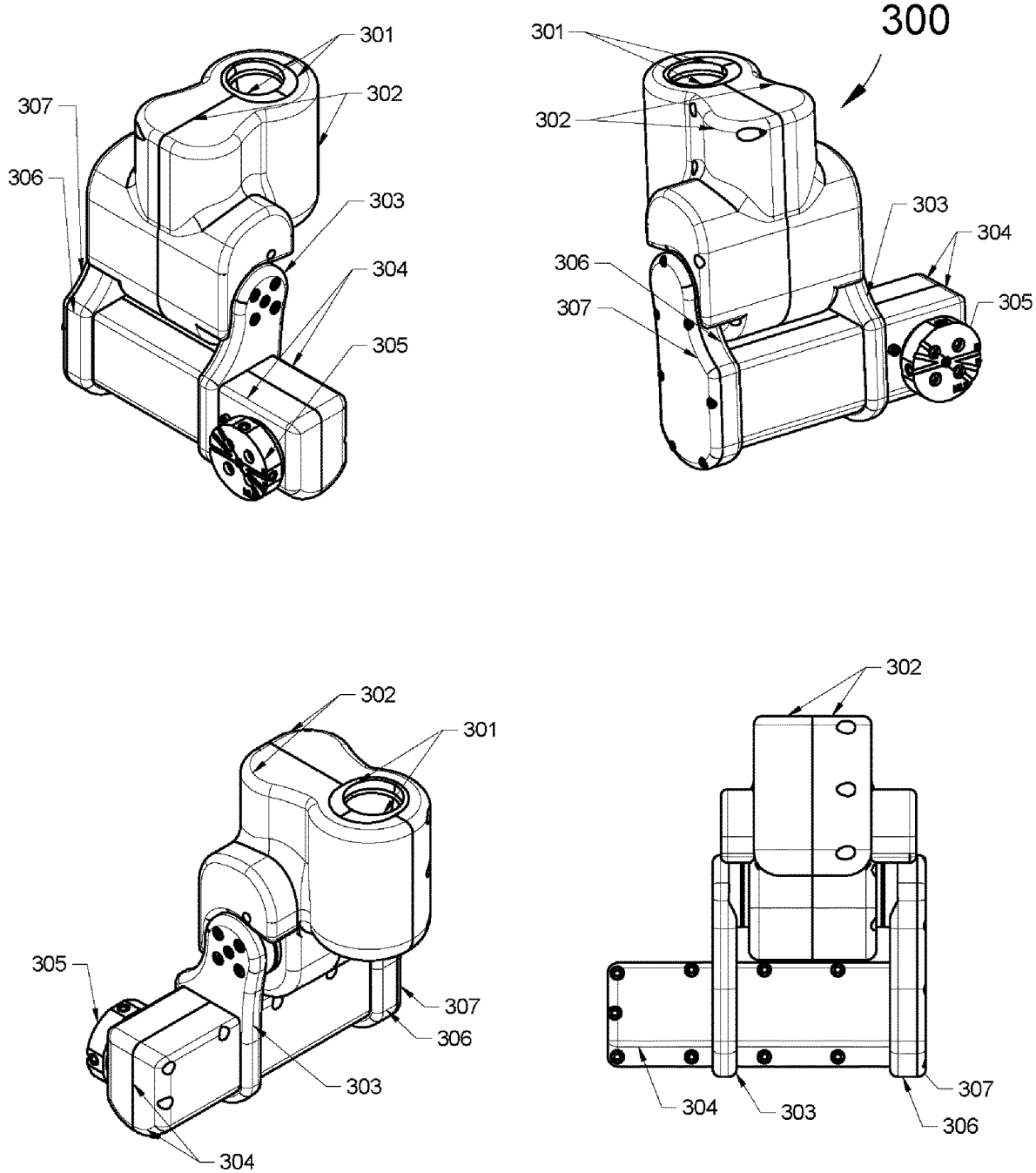
FIG. 7 depicts three isometric views of the articulating sensor module from different vantage points and one orthographic view of the articulating sensor module, according to an example embodiment of the present disclosure.

FIG. 7 depicts three isometric views of the articulating sensor module 300 from different vantage points and one orthographic view of the articulating sensor module 300, according to an example embodiment of the present disclosure. An angle adapter 301 may engage with an articulating sensor module main housing 302. A right lift arm 303 may be hinged upon the articulating sensor module main housing 302. A left lift arm 306 may be hinged upon the articulating sensor module main housing 302. A left lift arm cover 307 may be affixed to the left lift arm 306. An adapter motor housing 304 may be supported by and disposed through the right lift arm 303. In other examples, the adapter motor housing 304 may be supported by the right lift arm 303 but not disposed through the right lift arm 303. The adapter motor housing 304 may be engaged with and supported by the left lift arm 306. In various examples, the adapter motor housing 304 may be supported by only one lift arm, more than two lift arms, and/or other mounting configurations. The adapter motor housing 304 may engage with a sensor adapter mount 305. Various examples may incorporate the illustrated sensor adapter mounts and/other sensor adapter mounts which complement a variety of other sensors.

Figure 8:
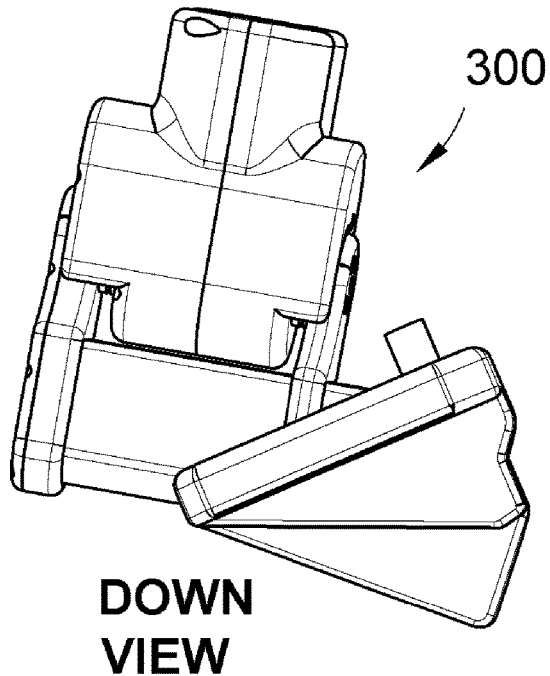
FIG. 8 depicts four isometric views of the articulating sensor module in different view states and/or from different vantage points, according to an example embodiment of the present disclosure.
Figure 8:
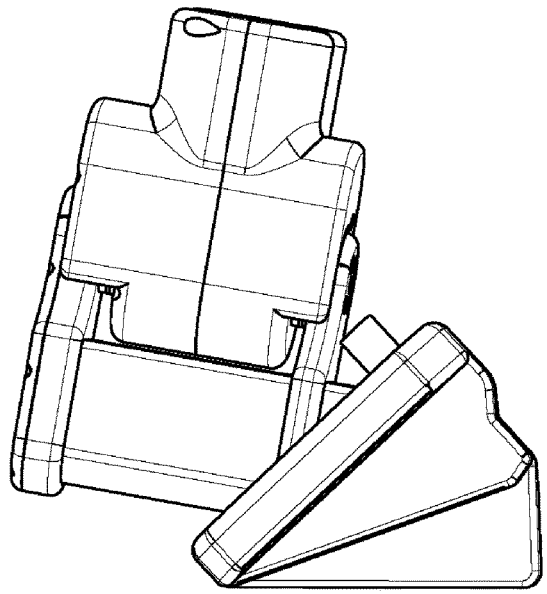
Figure 8:
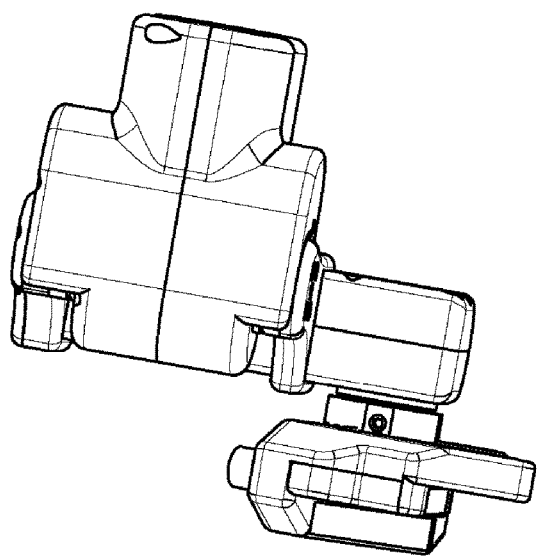
Figure 8:
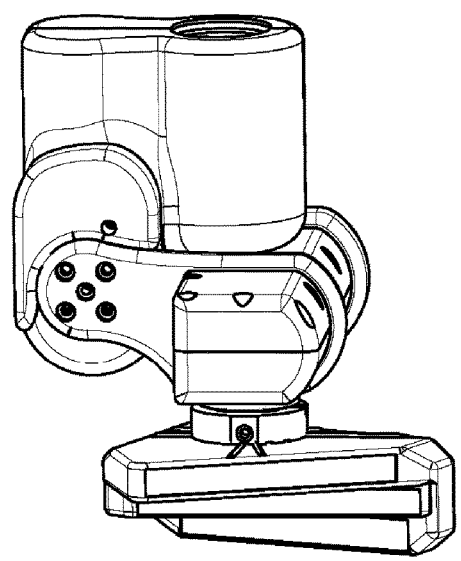

FIG. 8 depicts four isometric views of the articulating sensor module 300 in different view states and/or from different vantage points, according to an example embodiment of the present disclosure. As indicated in FIG. 8, the four isometric views of the articulating sensor module 300 include illustrations of the articulation of a sensor when the placement of the adapter motor 312 and the arm motor 412 are in a down view position, in a forward view position, and in a perspective view position.

Figure 9:
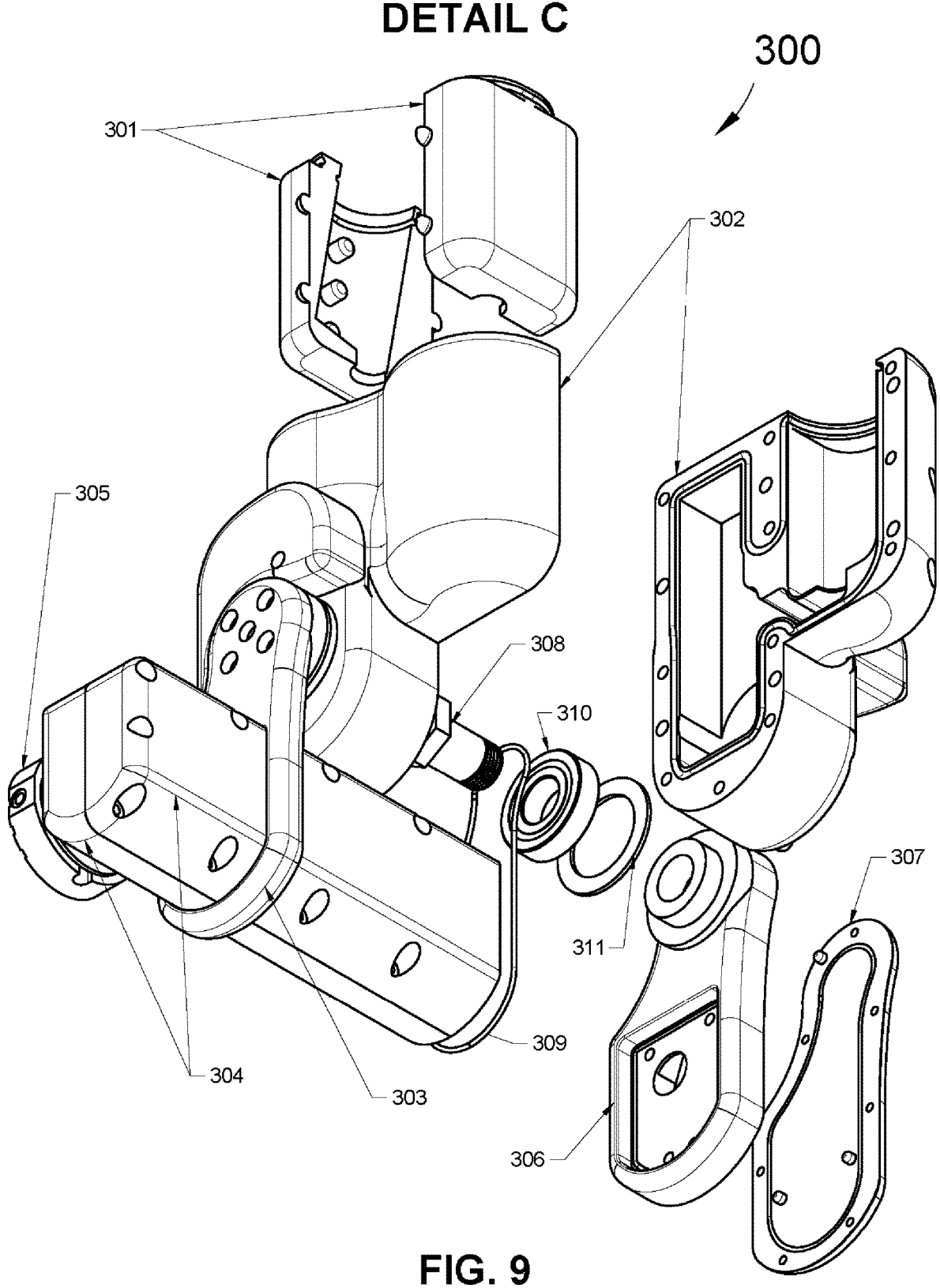
FIG. 9 depicts an exploded assembly isometric view of the articulating sensor module, according to an example embodiment of the present disclosure.

FIG. 9 depicts an exploded assembly isometric view of the articulating sensor module 300, according to an example embodiment of the present disclosure. The angle adapter 301 is shown above the articulating sensor module main housing 302. The angle adapter 301 may be fastened to the articulating sensor module main housing 302, or the angle adapter 301 and the articulating sensor module main housing 302 may be fashioned from the same piece of material. The right lift arm 303 may be hinged upon the articulating sensor module main housing 302. The adapter motor housing 304 may be supported by and disposed through the right lift arm 303. In various examples, the adapter motor housing 304 may be supported by the right lift arm 303 but not disposed through the right lift arm 303. The left lift arm 306 may be hinged upon the articulating sensor module main housing 302. The adapter motor housing 304 may be engaged with and supported by the left lift arm 306. In various examples, the adapter motor housing 304 may be supported by only one lift arm, more than two lift arms, or other mounting configurations. The left lift arm cover 307 may be affixed to the left lift arm 306. An adapter gasket 309 may sit between the left lift arm 306 and the left lift arm cover 307. Various other seals, O-rings, and/or gaskets may be employed in lieu of or in conjunction with the adapter gasket 309. The adapter motor housing 304 may be engaged with the adapter mount 305. Various examples may employ an adapter mount complementing any sensor the user wishes to mount to the device of the present disclosure.

The left lift arm 306 may be disposed through a third bearing 310 and an adapter seal 311. In various examples, these and/or other types of bearings, e.g., ball bearings and/or journal bearings, may be employed in lieu of or in conjunction with the third bearing 310. In various examples, these and/or other seals, gaskets, and/or O-rings may be employed in lieu of or in conjunction with the adapter seal 311. The hollow fastener 308 may engage with an adapter motor 312. An electrical connection may be wired through the hollow fastener 308 to the adapter motor 312. The adapter motor 312 may communicate with the microcontroller. In various examples, the adapter motor 312 may be in communication with one or more microcontrollers.

The microcontroller may communicate with one or more user-operated controllers. Communication from the microcontroller prompted by input from the user-operated controller may cause the drive shaft of the adapter motor 312 to rotate. The rotation of the drive shaft of the adapter motor 312 may cause the left lift arm 306, the adapter motor housing 304, and the right lift arm 303 to rotate with it.

Figure 10:
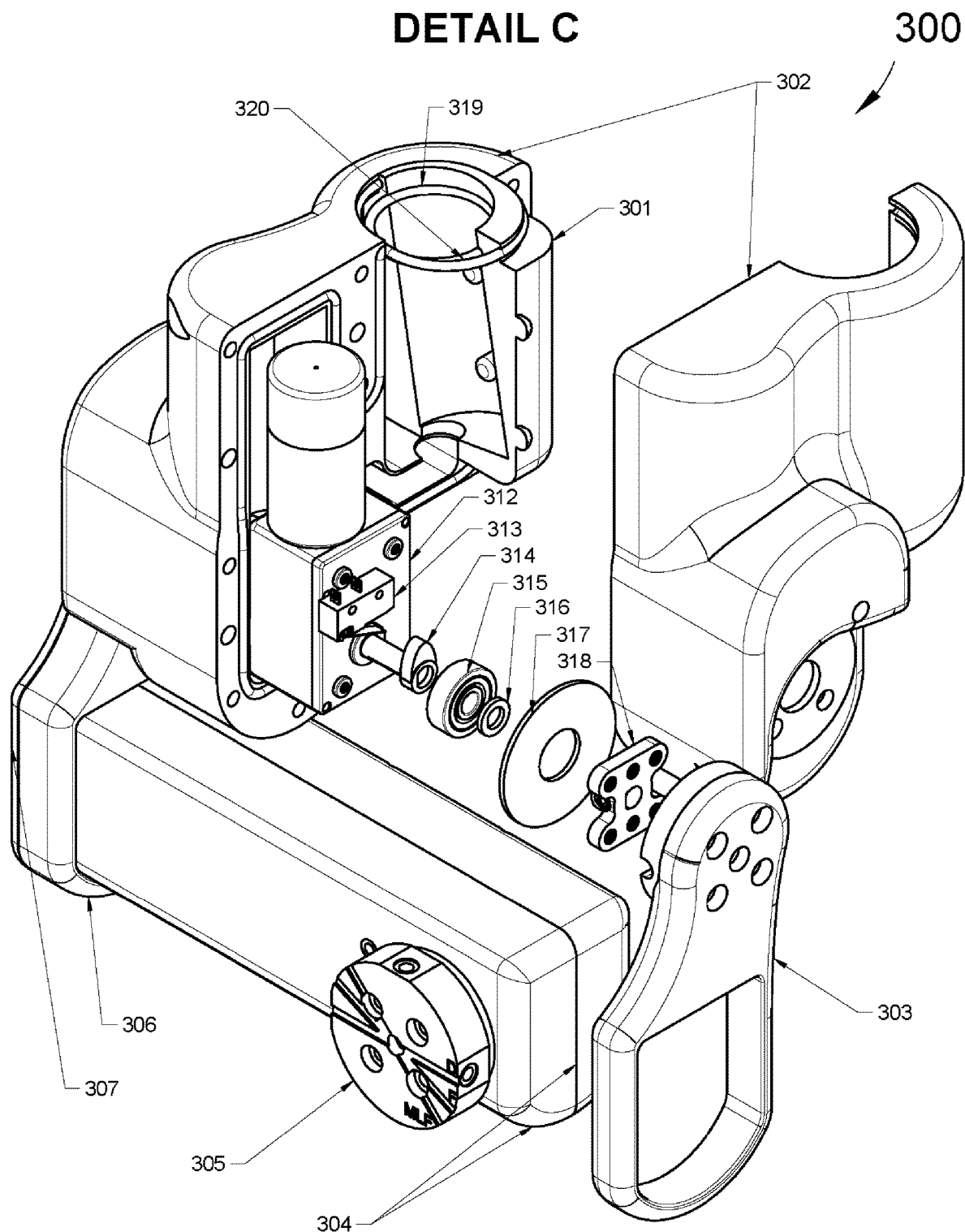
FIG. 10 depicts an exploded assembly isometric view of the articulating sensor module, according to an example embodiment of the present disclosure.

FIG. 10 depicts an exploded assembly isometric view of the articulating sensor module 300, according to an example embodiment of the present disclosure. The articulating sensor module main housing 302 is split open in the present exploded depiction of FIG. 10. The angle adapter 301 is depicted within the articulating sensor module main housing 302. The angle adapter 301 may be fastened to the articulating sensor module main housing 302 or the angle adapter 301. The articulating sensor module main housing 302 may be fashioned from a single piece of material. The adapter motor 312 is shown within the articulating sensor module main housing 302. The adapter motor 312 may be in communication with a microcontroller. In various examples, the adapter motor 312 may be in communication with one or more microcontrollers. An adapter motor homing switch 313 may be affixed to the face of the adapter motor 312. An adapter switch trigger 314 may be affixed to the motor shaft of the adapter motor 312. The adapter motor switch trigger 314 may rotate with the motor shaft of the adapter motor and may engage the adapter motor homing switch 313 at one or more certain angles of rotation. The motor shaft of the adapter motor 312 may be disposed through an adapter motor bearing 315, an adapter motor seal 316, and an adapter motor washer 317. In various examples, these and/or other types of bearings, e.g., ball bearings and/or journal bearings, may be employed in lieu of or in conjunction with the adapter motor bearing 315. In various examples, these and/or other seals, gaskets, and/or O-rings may be employed in lieu of or in conjunction with the adapter motor seal 316. The motor shaft of the adapter motor 312 may be engaged with an adapter motor mount plate 318. The adapter motor mount plate 318 may engage with the right lift arm 303.

The microcontroller may communicate with one or more user-operated controllers. Communication from the microcontroller prompted by input from the user-operated controller may cause the drive shaft of the adapter motor 312 to rotate. The adapter motor mount plate 318 may rotate with the motor shaft of the adapter motor 312. The right lift arm 303 may rotate with the adapter motor mount plate 318. The rotation of the right lift arm 303 may cause the adapter motor housing 304 and the left lift arm 306 to rotate with it.

Figure 11:
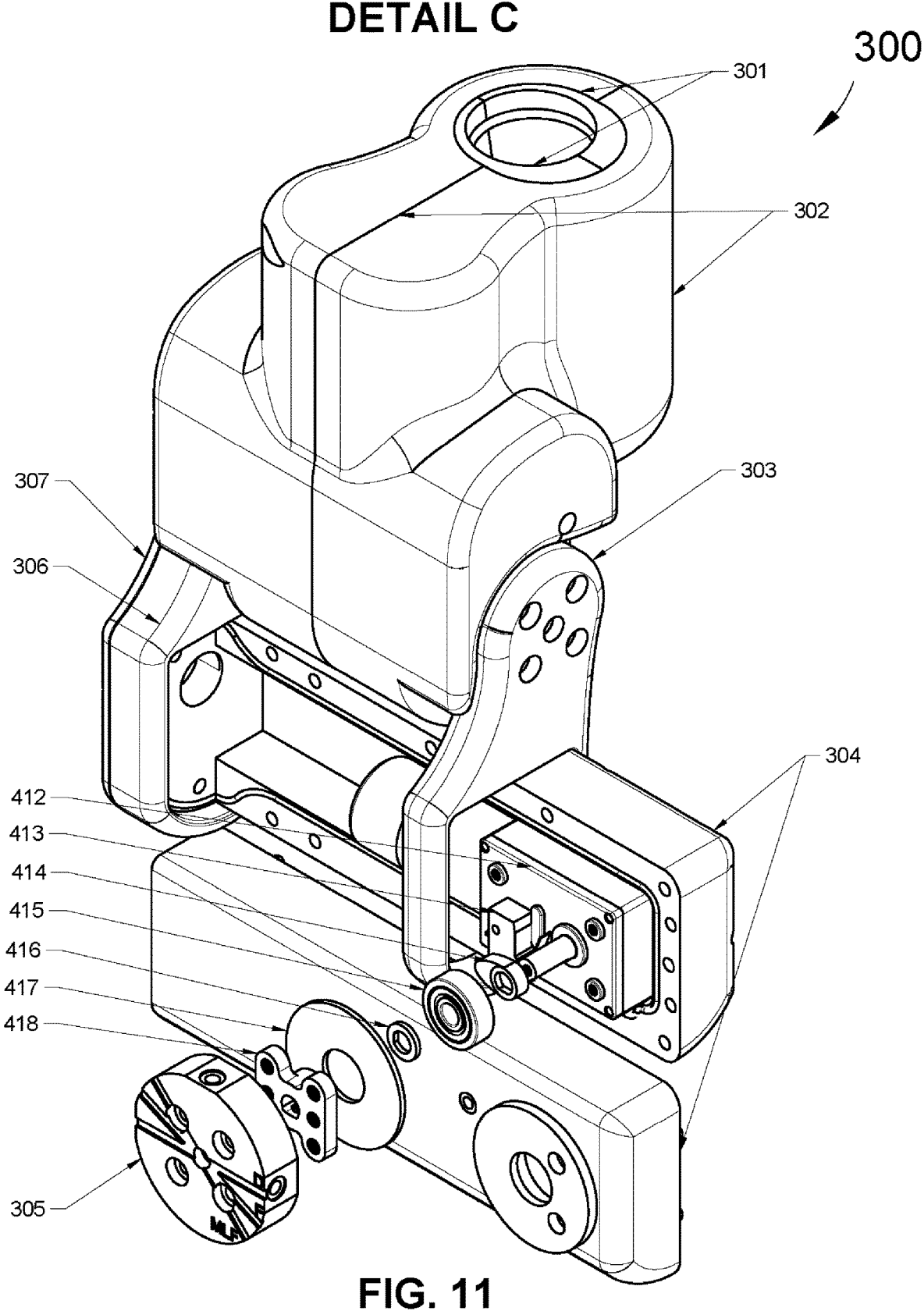
FIG. 11 depicts an exploded assembly isometric view of the articulating sensor module, according to an example embodiment of the present disclosure.

FIG. 11 depicts an exploded assembly isometric view of the articulating sensor module 300, according to an example embodiment of the present disclosure. The adapter motor housing 304 may house an arm motor 412. An arm motor homing switch 413 may be affixed to an exterior face of the arm motor 412. An arm motor switch trigger 414 may be affixed to the drive shaft of the arm motor 412. The arm motor switch trigger 414 may rotate upon the drive shaft of the arm motor 412 and may engage the arm motor homing switch 413. The drive shaft of the arm motor 412 may be disposed through an arm motor bearing 415, an arm motor seal 416, and an arm motor washer 417. In various examples, these and/or other types of bearings, e.g., ball bearings and/or journal bearings, may be employed in lieu of or in conjunction with the arm motor bearing 415. In various examples, these and/or other seals, gaskets, and/or O-rings may be employed in lieu of or in conjunction with the arm motor seal 416.

The microcontroller may communicate with one or more user-operated controllers. Communication from the microcontroller prompted by input from the user-operated controller may cause the drive shaft of the adapter motor 412 to rotate. The drive shaft of the arm motor 412 may engage with an arm motor mount plate 418. The arm motor mount plate 418 may thereby rotate with the drive shaft of the arm motor 412. The arm motor mount plate 418 may be mated with the sensor adapter mount 305. The sensor adapter mount 305 may thereby rotate with the arm mount plate 418. The depicted sensor adapter mount 305 is one of many exemplary mounts compatible with various examples of the present disclosure.

Figure 12:
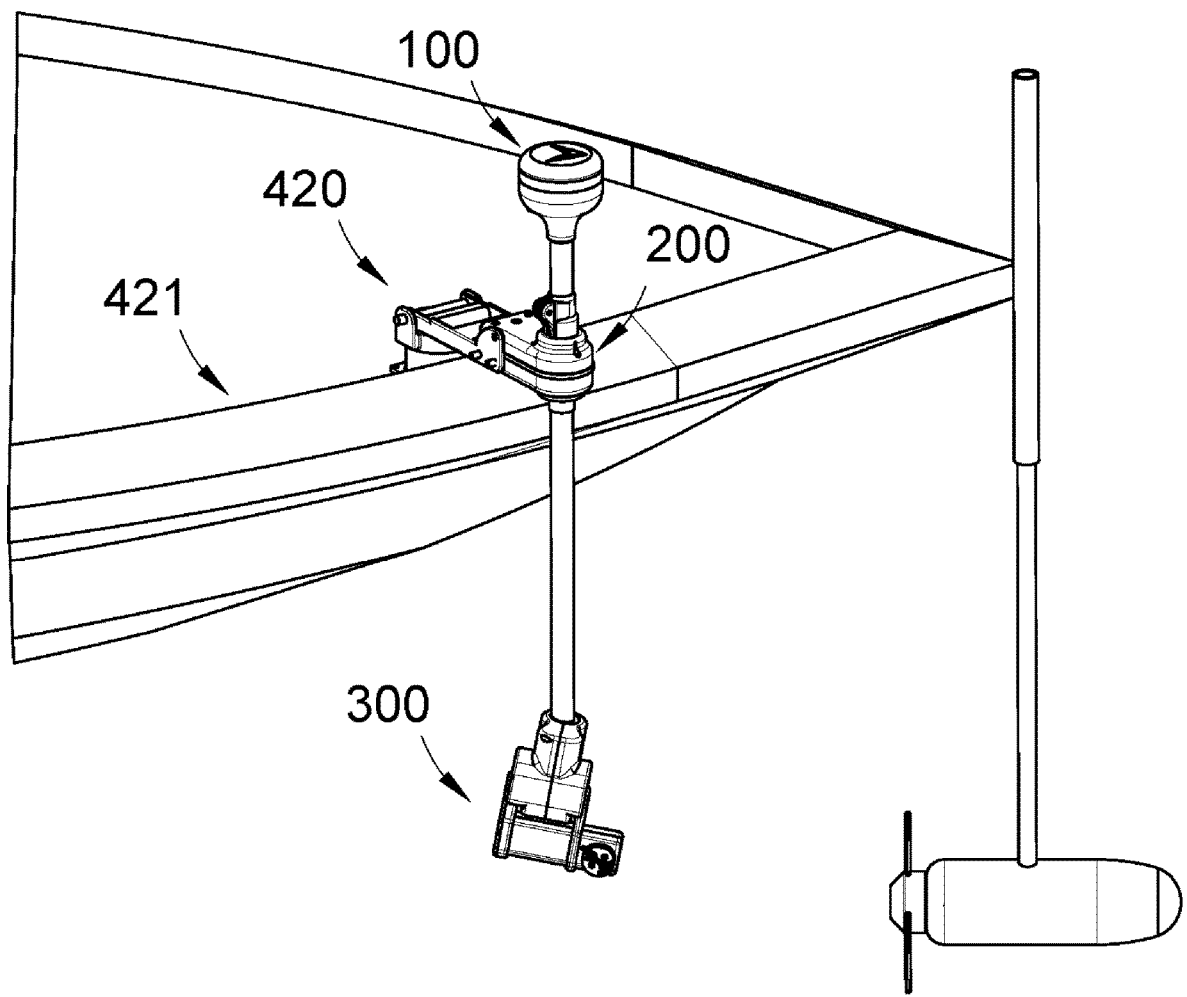
FIG. 12 depicts an isometric view of the present disclosure, according to an example embodiment of the present disclosure.

FIG. 12 depicts an isometric view of the present disclosure, including the electronics module 100, the transmission module 200, and the articulating sensor module 300, according to an example embodiment. This depiction includes a mounting arm 420 for mounting the transmission module 200 to a maritime vessel 421. The mounting arm 420 may be used to rotate the pole 106 via the transmission module 200 of the present disclosure, relative to the maritime vessel 421. In various examples, these and/or other mechanisms, e.g., joints, brackets, latches, and/or clamps, may be used in lieu of or in addition to the mounting arm 420. In some examples, the mounting arm 420 may be used to stow the pole 106, electronics module 100, transmission module 200, and/or the articulating sensor module 300 when the apparatus of the present disclosure is not in active use with a sensor. The depicted example illustrates the apparatus of the present disclosure mounted to the starboard bow of the maritime vessel 421. This depiction presents one of many example mounting configurations and example mounting platforms. The apparatus of the present disclosure may be mounted to various positions on a maritime craft other than as is depicted in FIG. 12. Moreover, various other platforms, maritime crafts, or other objects or vessels may be employed as a mounting platform for the apparatus of the present disclosure.

Figure 13:
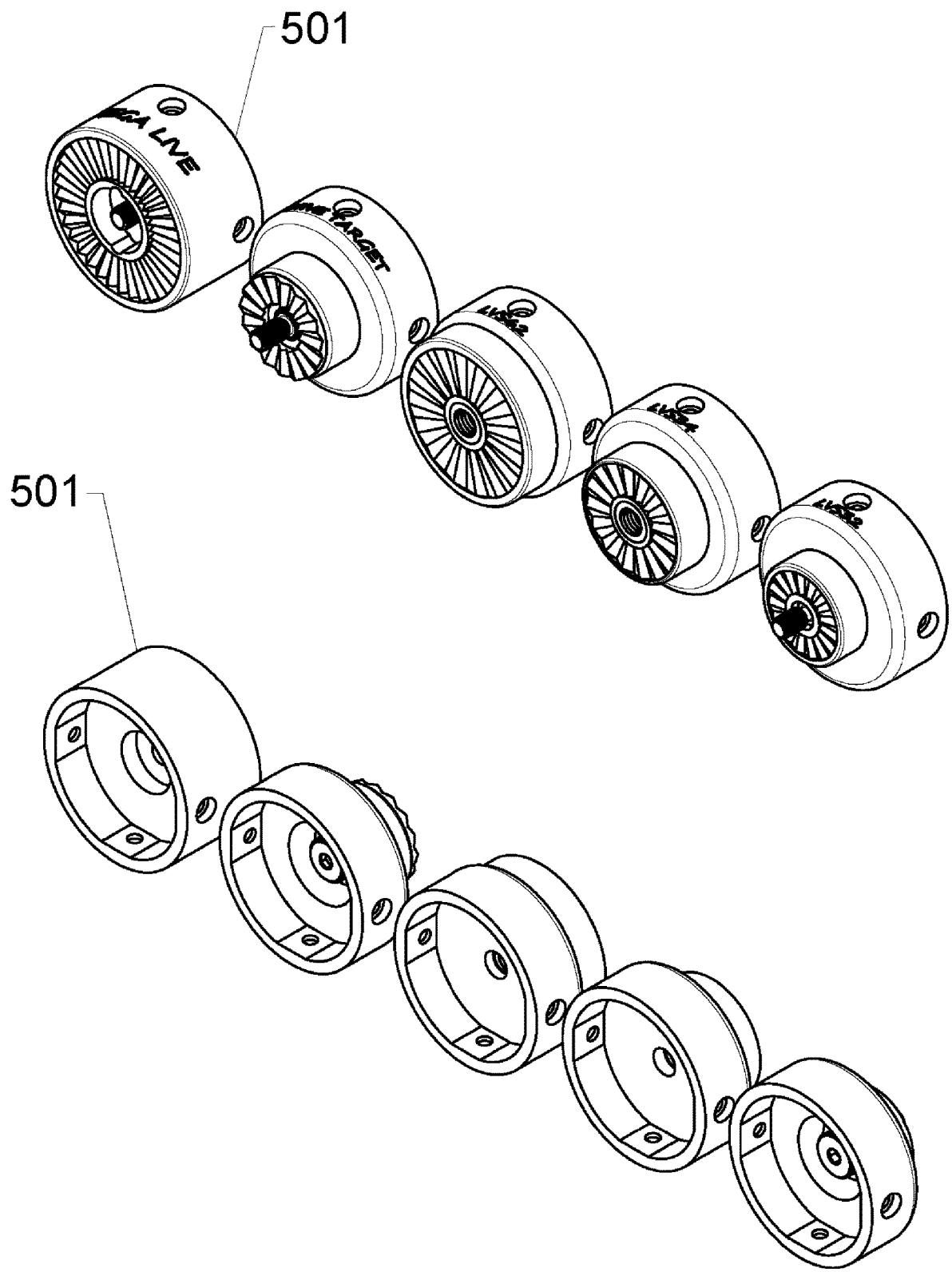
FIG. 13 depicts isometric views of the front and back faces of five transducer adapters, according to example embodiments of the present disclosure.

FIG. 13 depicts isometric views of the front and back faces of five transducer adapters 501, according to example embodiments of the present disclosure. The transducer adapters 501 may correspond to popular sensors that are currently on the market which may be used for detecting masses submerged in fluid bodies. Various examples may include alternative adapters, couplers, mounts, and/or other mounting mechanisms for various sensors.

Figure 14:
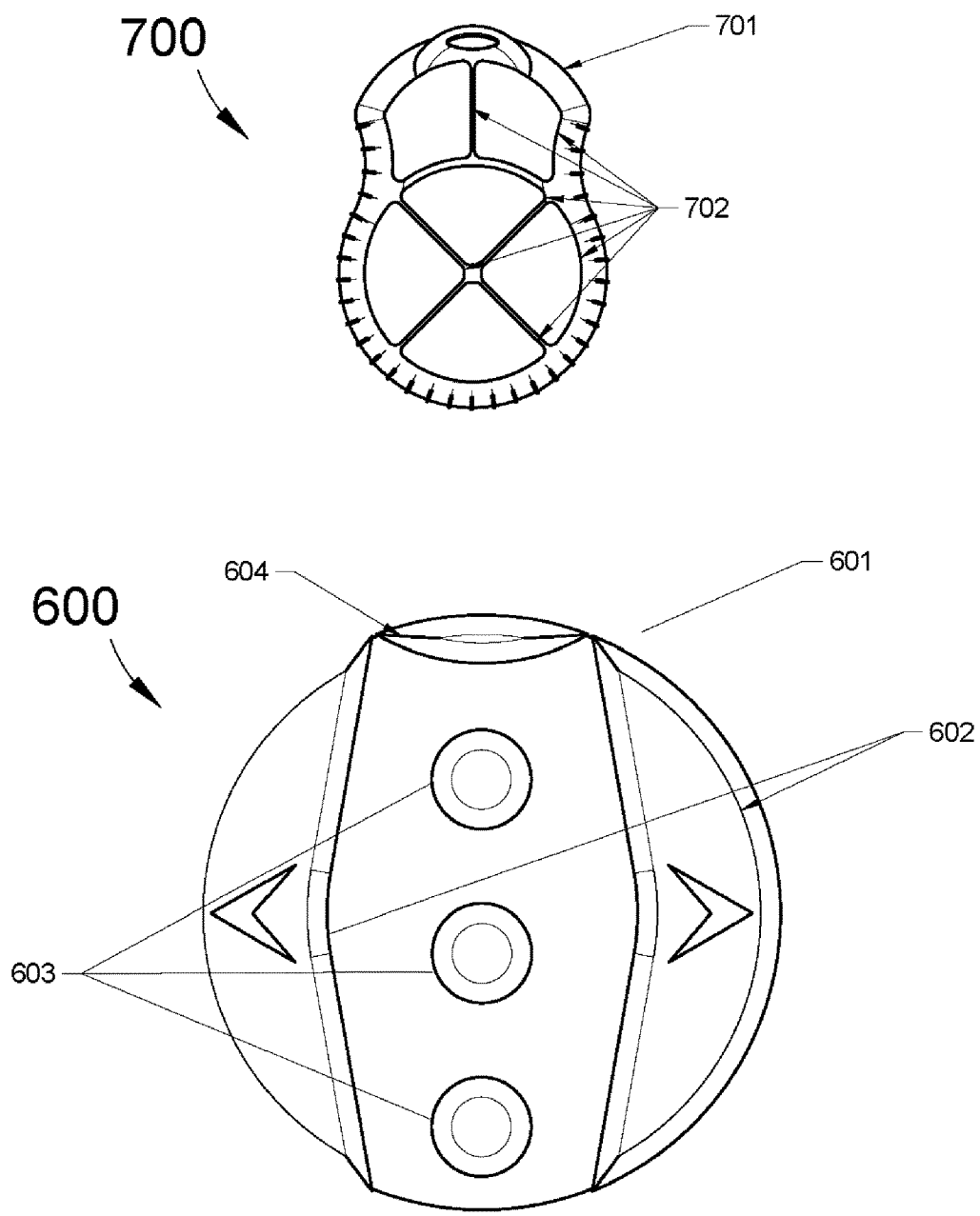
FIG. 14 depicts orthographic views of user-operated controllers, according to example embodiments of the present disclosure.

FIG. 14 depicts orthographic views of user-operated controllers, according to example embodiments of the present disclosure. An exemplary user foot controller 600 may have a user foot controller housing 601, user foot directional buttons 602, user foot functional mode buttons 603, and a user foot control power button 604. The user foot controller 600 may be operable with only the user's foot. This mode of operation may free users' hands for other tasks. An exemplary wireless user controller 700 may have a user wireless controller housing 701 and user wireless functional and power buttons 702. The exemplary user foot controller 600, wireless user controller 700, and/or other exemplary user controllers having a combination, superset, or subset of the features described in association with the user-operated controllers depicted in FIG. 14 may facilitate the user to operate the apparatus of the present disclosure with a single hand or with a single foot. This flexibility may facilitate the user to keep one or more hands free while operating the apparatus of the present disclosure. Various examples may incorporate these and/or other configurations. In various examples, the user-operated controllers may be wired or wireless. The depicted and other examples may be used with various types and sizes of sensors.

TABLE 1

Glossary of Reference Numbers

| NUM. | DESCRIPTION |
|------|-------------|
| 100 | electronics module |
| 200 | transmission module |
| 300 | articulating sensor module |

TABLE 1-continued

Glossary of Reference Numbers

| NUM. | DESCRIPTION |
|---|---|
| 101 | electronics module top |
| 102 | directional indicator |
| 103 | visual indicator |
| 104 | electronics module bottom |
| 105 | electrical port |
| 106 | pole |
| 107 | pole top |
| 108 | pole bottom |
| 201 | locking collar |
| 202 | locking fastener |
| 203 | transmission module top |
| 204 | transmission module bottom |
| 205 | Transmission system |
| 206 | first transmission seal |
| 207 | first transmission bearing |
| 208 | pole carrier |
| 209 | first transmission gear |
| 210 | transmission gasket |
| 211 | second transmission bearing |
| 212 | second transmission seal |
| 213 | transmission module motor |
| 214 | transmission module motor bracket mount |
| 215 | second transmission gear mount |
| 216 | second transmission gear |
| 301 | angle adapter |
| 302 | articulating sensor module main housing |
| 303 | right lift arm |
| 304 | adapter motor housing |
| 305 | sensor adapter mount |
| 306 | left lift arm |
| 307 | left lift arm cover |
| 308 | hollow fastener |
| 309 | adapter gasket |
| 310 | third bearing |
| 311 | adapter seal |
| 312 | adapter motor |
| 313 | adapter motor homing switch |
| 314 | adapter switch trigger |
| 315 | adapter motor bearing |
| 316 | adapter motor seal |
| 317 | adapter motor washer |
| 318 | adapter motor mount plate |
| 319 | inner o-ring |
| 320 | outer o-ring |
| 412 | arm motor |
| 413 | arm motor homing switch |
| 414 | arm motor switch trigger |
| 415 | arm motor bearing |
| 416 | arm motor seal |
| 417 | arm motor washer |
| 418 | arm motor mount plate |
| 420 | mounting arm |
| 501 | transducer adapters |
| 600 | user foot controller |
| 601 | user foot controller housing |
| 602 | user foot directional buttons |
| 603 | user foot functional mode buttons |
| 604 | user foot control power button |
| 700 | wireless user controller |
| 701 | user wireless controller housing |
| 702 | user wireless functional and power buttons |

The terms "comprising," "having," "including," and "containing" are to be construed as open-ended terms (i.e., meaning "including, but not limited to,") unless otherwise noted.

"Exemplary" is used herein to mean "serving as an example, instance, or illustration." Any aspect described in this document as "exemplary" is not necessarily to be construed as preferred or advantageous over other aspects.

The use of any and all examples, or exemplary language (e.g., "such as") provided herein, is intended merely to better illuminate the present disclosure and does not pose a limitation on the scope of the present disclosure unless otherwise claimed. No language in the specification should be construed as indicating any non-claimed element as essential to the practice of the present disclosure.

It is to be understood that where a particular feature is disclosed in the context of a particular aspect or embodiment of the present disclosure, or a particular claim, that feature may also be used, to the extent possible, in combination with and/or in the context of other particular aspects and embodiments of the present disclosure and in the present disclosure generally.

Recitation of ranges of values herein are merely intended to serve as a shorthand method of referring individually to each separate value falling within the range, unless otherwise indicated herein, and each separate value is incorporated into the specification as if it were individually recited herein.

The corresponding structures, materials, acts, and equivalents of all means or step plus function elements in the claims below are intended to include any structures, material or act for performing the function in combination with other claimed elements as specifically claimed. The description of the present disclosure has been presented for the purposes of illustration and description.

Where reference is made herein to a method comprising two or more defined steps, the defined steps may be carried out in any order or simultaneously (except where the context excludes that possibility). The method may include one or more other steps which are carried out before any of the defined steps, between two of the defined steps, or after all the defined steps (except where the context excludes that possibility).

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

The functions, acts or tasks illustrated in the Figures or described may be executed in a digital and/or analog domain and in response to one or more sets of logic or instructions stored in or on non-transitory computer readable medium or media or memory. The functions, acts or tasks are independent of the particular type of instructions set, storage media, processor or processing strategy and may be performed by software, hardware, integrated circuits, firmware, microcode and the like, operating alone or in combination. The memory may comprise a single device or multiple devices that may be disposed on one or more dedicated memory devices or disposed on a processor or other similar device. When functions, steps, etc. are said to be "responsive to" or occur "in response to" another function or step, etc., the functions or steps necessarily occur as a result of another function or step, etc. It is not sufficient that a function or act merely follow or occur subsequent to another. The term "substantially" or "about" encompasses a range that is largely (anywhere a range within or a discrete number within a range of ninety-five percent and one-hundred and five percent), but not necessarily wholly, that which is specified. It encompasses all but an insignificant amount.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112(f), unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

Throughout the drawings, like reference characters are used to designate like elements. As used herein, the term "engage" or "engaged" may indicate a connection. The connection may be a direct or an indirect connection between one or more items.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein and illustrated in the figures, can be arranged, substituted, combined, separated, and designed in a wide variety of different configurations, all of which are contemplated herein.

What is claimed is:

1. An apparatus for under water sensor positioning comprising:
  a pole comprising a first end and a second end;
  a transmission module comprising a transmission module motor, the transmission module structurally attached to the pole between the first end and the second end;

an articulating sensor module comprising an adapter motor, an arm motor, and a sensor connector, the articulating sensor module structurally attached to the pole proximate the second end; and a microcontroller configured to control positioning of the transmission module motor, the adapter motor, and the arm motor;

wherein:
the microcontroller is in communication with the transmission module motor, the adapter motor, and the arm motor;
the communication is based on input to the microcontroller from a user-operated controller;
the sensor connector is mounted to an outside of the articulating sensor module and configured to facilitate attachment of a sensor;
the transmission module motor is operably connected to the pole facilitating rotation of the pole substantially 360° around a longitudinal axis of the pole based on the communication;
the adapter motor is operably connected to the sensor connector facilitating rotation of the sensor connector around a first axis perpendicular to a perimeter of the sensor connector based on the communication; and
the arm motor is operably connected to the sensor connector facilitating rotation of the sensor connector around a second axis perpendicular to the first axis and substantially perpendicular to the longitudinal axis of the pole based on the communication such that the first axis ranges from substantially perpendicular to the longitudinal axis of the pole to substantially parallel with the longitudinal axis of the pole.

2. The apparatus of claim 1, further comprising an electronics module structurally connected to the pole proximate the first end and comprising the microcontroller.

3. The apparatus of claim 1, further comprising a mounting arm, the mounting arm at least in part facilitating the rotation of the sensor connector around the second axis.

4. The apparatus of claim 1, wherein the input to the microcontroller is obtained via a wireless communication.

5. The apparatus of claim 1, wherein the microcontroller is configured to, responsive to the input from the user-operated controller, selectively place the first sensor module adapter motor and the second sensor module arm motor in one of each of a down view position, a forward view position, and a perspective view position via the communication.

6. The apparatus of claim 1, further comprising a GPS module communicating with the microcontroller.

7. The apparatus of claim 6, wherein, based on GPS module input to the microcontroller, the microcontroller controls positioning the transmission module motor, the adapter motor, and the arm motor to obtain a GPS lock on a specific location.

8. The apparatus of claim 1, further comprising a GPS module communicating with the microcontroller and a compass module communicating with the microcontroller.

9. The apparatus of claim 8, wherein, based on GPS module input to the microcontroller and compass module input to the microcontroller, the microcontroller controls positioning the transmission module motor, the adapter motor, and the arm motor to obtain a GPS lock on a specific location.

10. An apparatus for under water sensing position indication comprising:
a pole comprising a first end and a second end;
a transmission module comprising a transmission module motor, the transmission module structurally attached to the pole between the first end and the second end;
an articulating sensor module comprising an adapter motor, an arm motor, and a sensor connector, the articulating sensor module structurally attached to the pole proximate the second end;
a microcontroller configured to control positioning of the transmission module motor, the adapter motor, and the arm motor; and
an electronics module comprising a light array;
wherein:
the microcontroller is in communication with the light array, the transmission module motor, the adapter motor, and the arm motor;
the communication is based on input to the microcontroller from a user-operated controller;
the sensor connector is mounted to an outside of the articulating sensor module and configured to facilitate attachment of a sensor; the transmission module motor is operably connected to the pole facilitating rotation of the pole;
the adapter motor is operably connected to the sensor connector facilitating rotation of the sensor connector around a first axis based on the communication;
the second sensor module arm motor is operably connected to the sensor connector facilitating rotation of the sensor connector around a second axis based on the communication; and
the light array indicates placement of the adapter motor and the arm motor in each of a down view position, a forward view position, and a perspective view position via the communication.

11. The apparatus of claim 10, further comprising a mounting arm, the mounting arm at least in part facilitating rotation of the sensor connector around the second axis.

12. The apparatus of claim 10, wherein the input to the microcontroller is obtained via a wireless communication.

13. The apparatus of claim 10, further comprising a GPS module communicating with the microcontroller.

14. The apparatus of claim 10, further comprising an electronics module structurally connected to the pole proximate the first end, the electronics module comprising the microcontroller and the light array.

15. The apparatus of claim 10, wherein the light array comprises an array of LEDs capable of emitting a plurality of colors.

16. The apparatus of claim 15, further comprising an indicator cap proximate the first end, wherein the indicator cap comprises the array of LEDs.

17. The apparatus of claim 16, wherein the array of LEDs are arranged in a ring around a diameter of the indicator cap.

18. An apparatus for under water sensing comprising:
a pole comprising a first end and a second end;
a transmission module comprising a transmission module motor, the transmission module structurally attached to the pole between the first end and the second end;
an articulating sensor module comprising a an adapter motor, a an arm motor, and a sensor connector, the articulating sensor module structurally attached to the pole proximate the second end; and
an electronics module structurally connected to the pole proximate the first end, the electronics module comprising:

an array of LEDs arranged in a ring around a diameter of the electronics module, and a microcontroller configured to control positioning of the transmission module motor, the adapter motor, and the arm motor;

wherein:

the microcontroller is in communication with the array of LEDs, the transmission module motor, the adapter motor, and the arm motor;

the communication is based on input to the microcontroller from a user-operated controller;

the sensor connector is mounted to an outside of the articulating sensor module and configured to facilitate attachment of a sensor;

the transmission module motor is operably connected to the pole facilitating rotation of the pole substantially 360° around a longitudinal axis of the pole based on the communication;

the adapter motor is operably connected to the sensor connector facilitating rotation of the sensor connector around a first axis perpendicular to a perimeter of the sensor connector based on the communication;

the arm motor is operably connected to the sensor connector facilitating rotation of the sensor connector around a second axis perpendicular to the first axis and substantially perpendicular to the longitudinal axis of the pole based on the communication such that the first axis ranges from substantially perpendicular to the longitudinal axis of the pole to substantially parallel with the longitudinal axis of the pole; and the array of LEDs indicates placement of the adapter motor and the arm motor in each of a down view position, a forward view position, and a perspective view position via the communication.

* * * * *